Oct. 18, 1927.
S. F. DAVENPORT
1,645,644
ARTIFICIAL BAIT
Filed Oct. 4, 1926
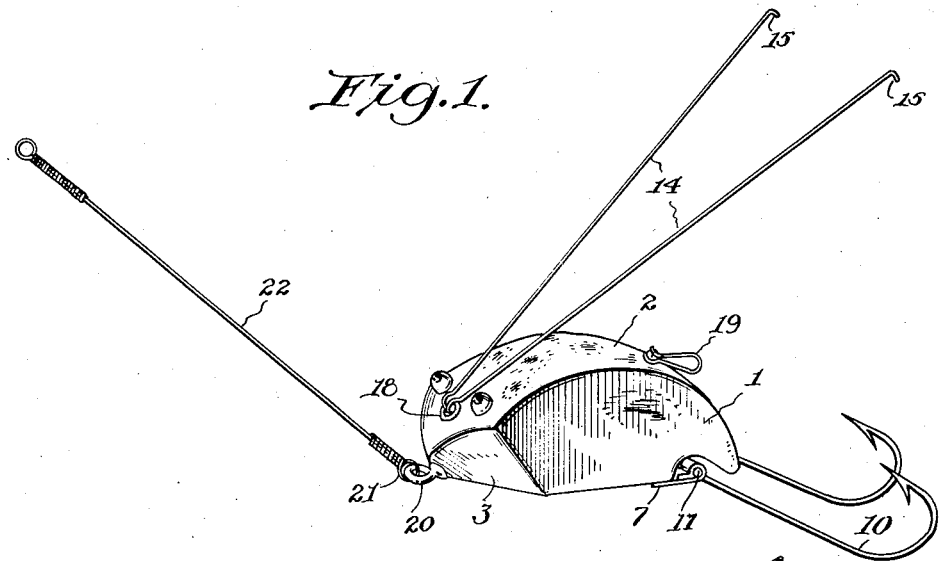
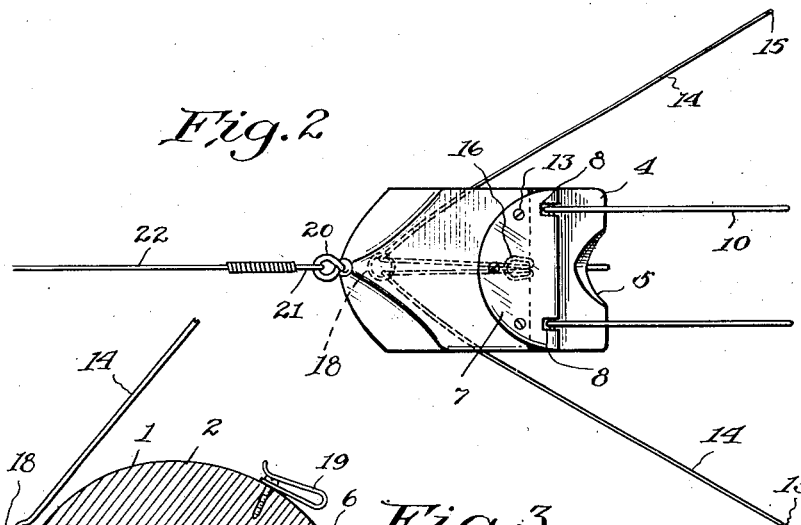
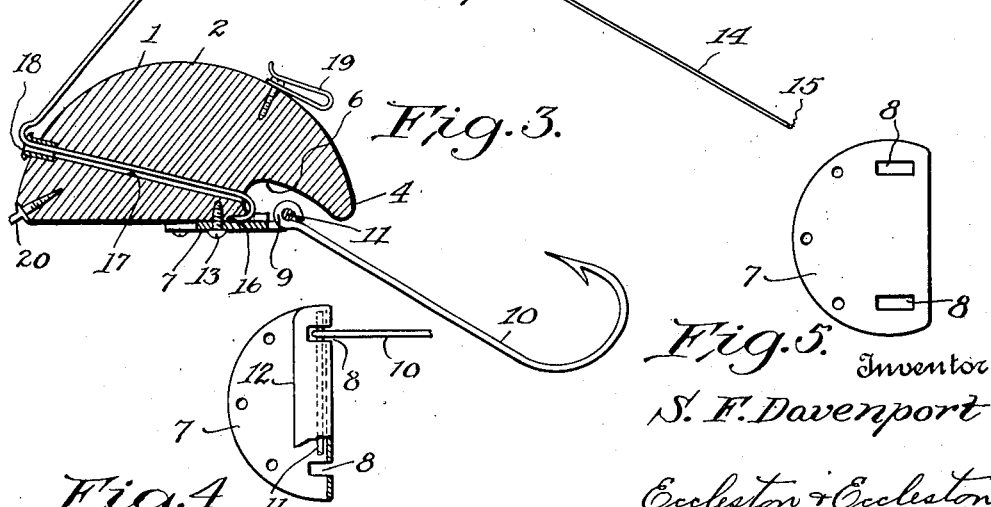
Inventor
S. F. Davenport
Eccleston & Eccleston.
Attorneys Patented Oct. 18, 1927.

1,645,644

UNITED STATES PATENT OFFICE.

SAM F. DAVENPORT, OF AUBURN, INDIANA, ASSIGNOR TO THE CREEK-CHUB BAIT CO., OF GARRETT, INDIANA, A CORPORATION OF INDIANA.

ARTIFICIAL BAIT.

Application filed October 4, 1926. Serial No. 139,462.

This invention relates to fishing tackle and has special reference to an artificial bait or lure to be used in trolling for fish.

An object of the invention resides in the provision of a lure body of less specific gravity than water and which presents a curved upper surface, a flat under surface, a pointed front, squared stern with a V-shaped notch, and upwardly and outwardly directed planes at its forward end.

A further object of the invention consists in a novel means for mounting hooks on the lure body which not only allows the hooks to swing freely, but also serves as a weight and to draw the strike of the fish to the hooks.

Another object of the invention resides in novel means for attaching the weed guards to the lure body so as to avoid sharp bends which tend to cause breakage of the wires.

Other objects and advantages of the invention will be apparent from the following description when taken in connection with the accompanying drawings, in which:

Figure 1 is a perspective view of the artificial bait.

Figure 2 is a bottom plan view thereof.

Figure 3 is a vertical section through the body of the lure.

Figure 4 is a detail view of the hook attaching plate, parts being broken away; and Figure 5 is a plan view of the metal plate before the hooks are attached and the plate bent up to engage the hinge pintle.

Referring to the drawing in greater detail the numeral 1 indicates the body of the lure which is formed of wood or other light material, and which is rounded on its upper surface as indicated by the numeral 2 so as to cause the lure to right itself should it become inverted. This rounded upper surface also more nearly simulates the shape of an insect or animal.

Upwardly and outwardly directed planes 3 are formed on each side of the forward part of the body 1 so as to cause the forward motion of the bait to force the same out of the water or at least to the surface thereof, these planes also serve to create a spray in simulation of a swimming insect or animal. The rear end of the body 1 is squared off as indicated by numeral 4 so as to produce a violent wake and is provided with a V-shaped notch or recess 5 in further simulation of an insect. The entire body of the lure may be decorated to present the appearance of a large beetle, frog or the like.

The under surface of the body of the lure is entirely flat except for a transverse groove 6 which receives a portion of the hook securing means, and this flat portion affords a secure anchorage for the hooks to be now described.

A sheet metal plate 7 is provided with slots 8 for the reception of eyes 9 of the hooks 10, and a hinge pintle 11 is then extended through the eyes, and the edge of the plate crimped over as indicated by numeral 12. These parts may, of course, be assembled in any manner desired. The plate thus constructed is attached to the bottom of the body 1 by means of screws 13, the portion of the plate and the eyes 9 of the hooks 10 being received within the groove 6. By this construction of attaching means for the hooks it will be apparent that the hooks are mounted for free swinging movement and that the bottom of the lure is substantially smooth and flat and free from obstructions which might become caught in weeds or the like. Also in this construction the rear end of the body and the rear edge of the plate serve as stops to limit the swinging movement of the hooks. Furthermore, the plate 7 which is of bright metal serves not only to draw the strike of the fish to the hooks but also as a weight to maintain the body in upright position.

To prevent the hooks from becoming entangled with weeds, etc., wire guards 14 are provided. These guards may consist of a single piece of wire bent upon itself to provide the arms 14 and these arms may have downturned ends 15 to provide a finish and may be also provided with other bends to produce an attractive appearance so long as the general direction of the arms is as indicated on the drawing. The guards 14 are attached to the body 1 by passing the doubled end 16 thereof downwardly through the diagonal passage 17 and bending this doubled end against the flat bottom of the body 1 where it is clamped by means of the hook attaching plate 7. This construction forms a secure anchorage for the guards and, due to the long torsional spring action provided, reduces breakage of the guards to a minimum. A sleeve 18 is secured in the forward end of the passage 17 and the guards are bent at the mouth of the sleeve so as to extend over the points of the hooks 10.

Mounted on the rear of the curved back 2 is a spring hook 19 for the attachment of a strip of fabric, rubber, pork rind, or other flexible material which assumes a wiggling action in further simulation of a living body.

An eye 20 is secured to the forward end of the body 1 and receives the loop 21 of a fishline leader 22.

From the foregoing description considered in connection with the accompanying drawing it will be apparent that I have devised an exceedingly simple lure or artificial bait of inexpensive construction in which the fish hooks are pivotally connected to the bottom of the body portion without presenting projections liable to be caught in weeds, etc., that the lure body is so shaped as to right itself should it become inverted in use; that it is also shaped so as to be properly guided through the water and to agitate the water in simulation of a living body, and that the weed guards employed are so mounted as to eliminate short bends or turns thereby prolonging the life of the guards.

In accordance with the patent statutes I have described what I now believe to be the best embodiment of the invention, but I do not wish to be understood thereby as limiting myself or the scope of the invention, as many changes and modifications may be made therein without departing from the spirit of the invention; all such I aim to include in the scope of the appended claims.

What I claim as new and desire to secure by Letters Patent is:

1. In an artificial bait, a body portion having a pointed front end and a flat bottom with a transverse groove therein, and provided with a squared rear end to produce a violent wake and having a pronounced notch therein in simulation of an insect, and hooks pivotally connected to the bottom of said body portion with their pivots disposed in said transverse groove.

2. In an artificial bait, a body portion provided with a transverse groove in its bottom, a hook pivoted to said body portion to swing in a vertical plane, the connection between said hook and body portion being mounted in said transverse groove.

3. In an artificial bait, a body portion provided with a transverse groove on its bottom, a plate, a hook hingedly connected to said plate, and means for securing the plate to the bottom of the body portion with the hinge positioned in said groove.

4. In an artificial bait, a body portion provided with a transverse groove on its bottom adjacent the rear end thereof, a bright metallic plate, a hook hingedly connected to said plate, and means for securing the plate to the bottom of the body portion with the hinge positioned in said groove.

5. In an artificial bait, a body portion provided with a flat bottom portion and a passage extending substantially longitudinally thereof, a wire weed guard having a portion extending through said passage, the rear end of the wire being bent against the bottom of the body and the forward portion of the wire being bent upwardly and rearwardly, and a hook attaching plate secured to the bottom of the body and clamping the bent rear end of the wire guard against the body portion of the bait.

6. In an artificial bait, a body portion having a transverse groove in the bottom thereof and a passage extending through said body from the forward end to said groove, a wire weed guard having a portion extending through said passage into said groove, the rear end of said wire being bent against the bottom of the bait body, the forward portion of the wire being bent upwardly and rearwardly, a hook plate secured to the bottom of the bait body to clamp the rear bent end of said wire against the bait body, and hinges formed on an edge of said plate and positioned in said groove so as to hingedly connect the hooks to the bait body.

SAM F. DAVENPORT.